United States Patent [19]

Hirai et al.

[11] Patent Number: 5,187,994
[45] Date of Patent: Feb. 23, 1993

[54] ROTARY MOTION TO LONGITUDINAL MOTION CONVERTING MECHANISM

[75] Inventors: Masanori Hirai; Hiroyuki Takenaka, both of Gifu; Hidekazu Yokoi, Tokyo; Tsuyoshi Nachi, Gifu; Kiyoshi Ando, Ogaki, all of Japan

[73] Assignee: Teijin Seiki Co., Ltd., Osaka, Japan

[21] Appl. No.: 777,717

[22] Filed: Oct. 21, 1991

[30] Foreign Application Priority Data

| Oct. 23, 1990 | [JP] | Japan | 2-286260 |
| Dec. 13, 1990 | [JP] | Japan | 2-401984 |
| Dec. 13, 1990 | [JP] | Japan | 2-401985 |
| Jun. 3, 1991 | [JP] | Japan | 3-130145 |

[51] Int. Cl.$^5$ .............................................. F16H 29/20
[52] U.S. Cl. ........................................ 74/120; 74/122
[58] Field of Search ................. 74/116, 120, 122, 121, 74/123

[56] References Cited

U.S. PATENT DOCUMENTS

| 2,359,420 | 10/1944 | Herzog | 74/120 |
| 3,127,004 | 3/1964 | Richter et al. | 74/122 X |
| 3,655,020 | 4/1972 | Van Slooten | 74/116 X |
| 4,653,344 | 3/1987 | Nelson | 74/122 X |
| 4,895,046 | 1/1990 | Everman | 74/122 X |

FOREIGN PATENT DOCUMENTS

| 2360312 | 4/1975 | Fed. Rep. of Germany . |
| 1-65973 | 10/1987 | Japan . |
| 1114834 | 9/1984 | U.S.S.R. ............................ 74/116 |
| 2054794 | 2/1981 | United Kingdom . |
| WO8605634 | of 0000 | World Int. Prop. O. . |

Primary Examiner—Dirk Wright
Attorney, Agent, or Firm—Lane, Aitken & McCann

[57] ABSTRACT

A rotary motion to longitudinal motion converting mechanism comprising a passive rack with a plurality of teeth, a plurality of active racks respectively having a plurality of teeth having the same pitch as that of the teeth of the passive rack and meshing with the passive rack, and a plurailty of rotatable crankshafts respectively having eccentric circular portions different in phase from one another and respectively having the active racks supported on the eccentric circular portions in such a manner that the passive rack is moved in its longitudinal direction through the active racks by rotary motions of the plurality of rotatable crankshafts.

7 Claims, 16 Drawing Sheets

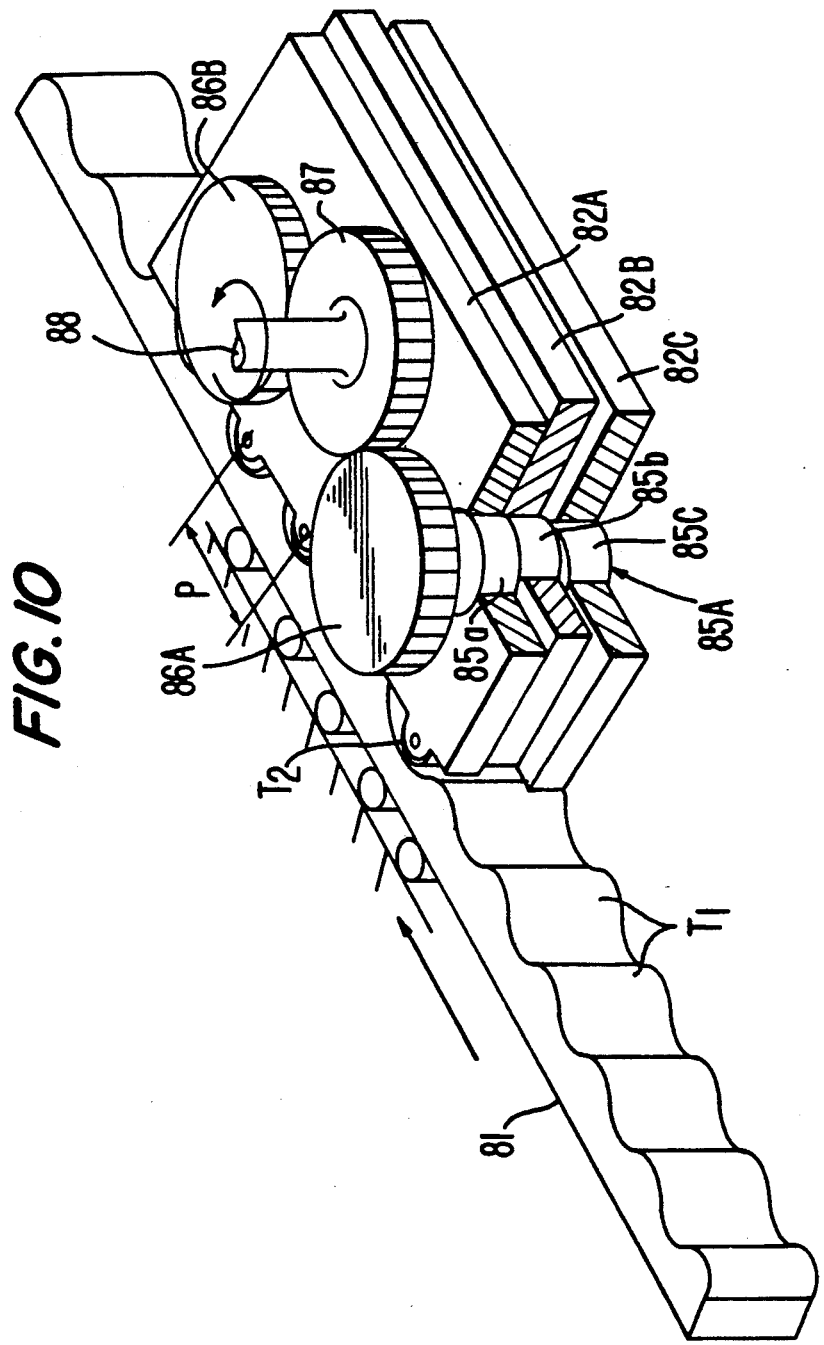

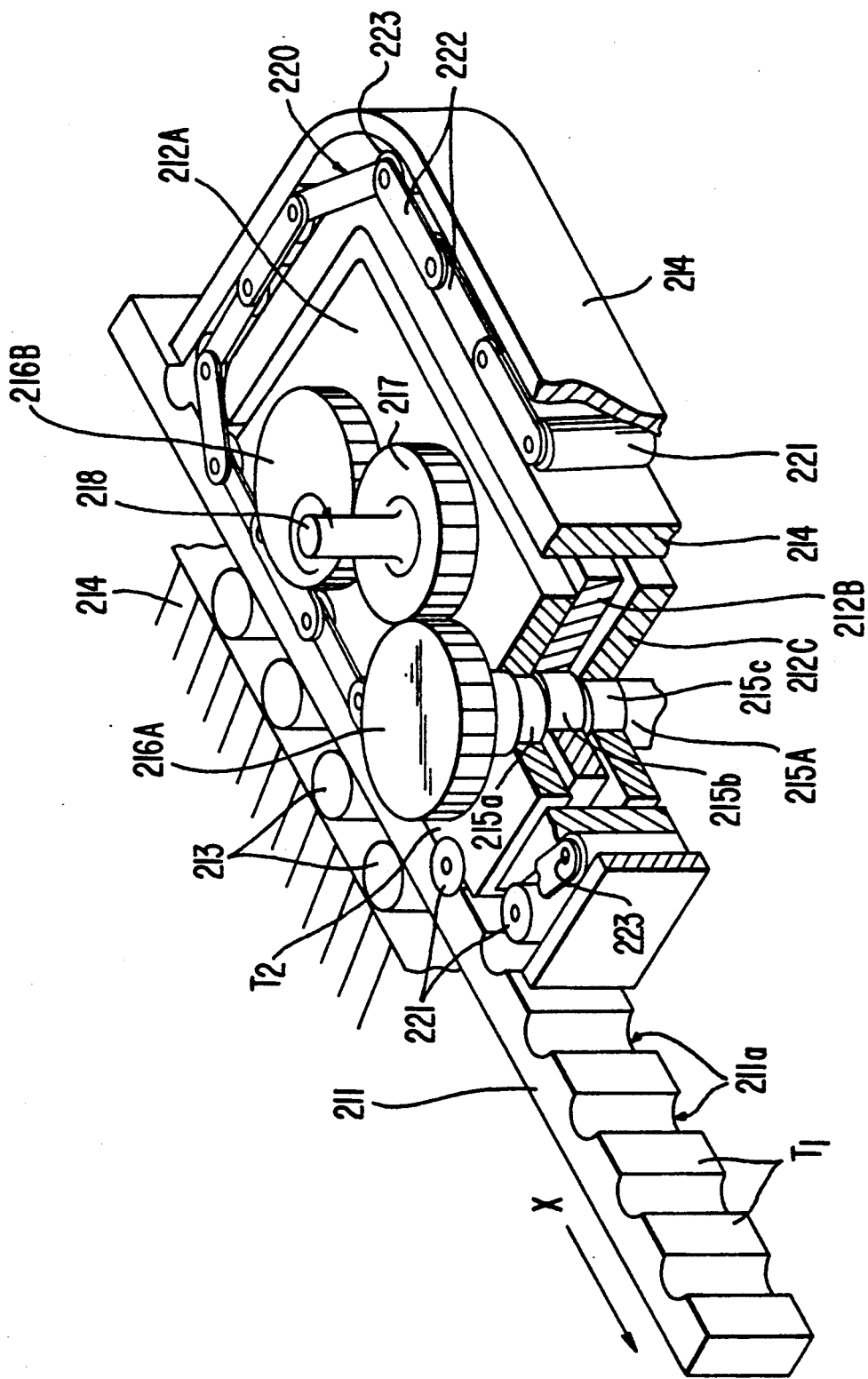

ROTARY MOTION TO LONGITUDINAL MOTION CONVERTING MECHANISM

FIELD OF THE INVENTION

The present invention relates to a rotary motion to longitudinal motion converting mechanism that converts rotary motion into longitudinal motion, and more particularly to such a mechanism in which that conversion is performed by combination of passive and active racks.

DESCRIPTION OF THE PRIOR ART

In the feeding mechanism of a metal cutting machine tool, a mechanism that converts rotary motion into longitudinal motion has been used. The converting mechanism is structurally simple in order to prevent the size of the machine tool from being increased.

As a rotary motion to longitudinal motion mechanism of the above kind, there is known a rack-and-pinion mechanism such as that shown in FIG. 22. In this mechanism, a rack 22 is caused to move in its longitudinal direction by the rotation of a pinion 21 about its own axis. Also, there is known a mechanism such as that shown in FIG. 23. This mechanism is constructed such that the direction of motion is performed between a rack 23 and a pin gear 24 meshing with this rack 23.

However, there is the drawback that the conventional mechanisms described above become a large size, because it is necessary to decelerate the rotation of the pinion 21 or pin gear 24 with the use of an additionally provided speed reducer. In addition, since the number of engagement teeth between the pinion 21 and the rack 22 or between the rack 23 and the pin gear 24 is small (1 or 2), the mechanism must be constructed such that it can endure a constant tooth surface pressure by enlarging the respective tooth widths, in order to obtain a predetermined rack thrust. The large tooth width also causes the conventional mechanisms to become a large size.

It is, accordingly, an important object of the present invention to provide a rotary motion to longitudinal motion converting mechanism which is small in size and has large thrust.

SUMMARY OF THE INVENTION

The foregoing object is accomplished in accordance with a first embodiment of the present invention by providing a rotary motion to longitudinal motion converting mechanism comprising a passive rack with a plurality of teeth, and a plurality of active racks respectively having a plurality of teeth having the same pitch as that of the teeth of the passive rack and meshing with the passive rack. The mechanism further comprises a plurality of rotatable crankshafts respectively having eccentric circular portions different in phase from one another and respectively having the active racks supported on the eccentric circular portions in such a manner that the passive rack is moved in its longitudinal direction through the active racks by rotary motions of the plurality of rotatable crankshafts. The rotary motion to longitudinal motion converting mechanism may further comprise passive-rack guiding means that comprises longitudinal grooves formed in opposite side portions of the passive rack and a plurality of balls rotatably received in the longitudinal grooves.

In the first embodiment, a plurality of rotatable crankshafts respectively have eccentric circular portions different in phase from one another and respectively have the active racks supported on the eccentric circular portions in such a manner that the passive rack is moved in its longitudinal direction through the active racks by rotary motions of the plurality of rotatable crankshafts. Therefore, if the crankshafts rotate, at least one of the active racks is always brought into engagement with the passive rack, so that the passive rack is caused to move in the longitudinal direction thereof. A side pressure applied to the individual tooth of the active racks becomes smaller because the passive rack is pushed by a suitable number of teeth disposed along the passive rack. Consequently, a rotary motion to longitudinal motion converting mechanism whose thrust is large can be accomplished. In addition, since an output reduced in speed by one pitch of the tooth of the passive rack with respect to one revolution of each of the crankshafts is obtained by the motions of the active racks, an additional speed reducer is not needed. Accordingly, a rotary motion to longitudinal motion converting mechanism of very small size can be accomplished.

The foregoing object is also accomplished in accordance with a second embodiment of the present invention by providing a rotary motion to longitudinal motion converting mechanism comprising a passive rack with a plurality of teeth, a plurality of active racks respectively having a plurality of teeth having the same pitch as that of the teeth of the passive rack and meshing with the passive rack, a casing having a plurality of crankshafts freely rotatably supported thereon, and drive means mounted on the casing and connected to one of the plurality of crankshafts for driving the one crankshaft. When the one crankshaft is rotated by the drive means, the remaining crankshafts are rotated together with the one crankshaft through the plurality of active racks. The plurality of crankshafts respectively have eccentric circular portions different in phase from one another and respectively have the active racks supported on the eccentric circular portions in such a manner that the passive rack is moved in its longitudinal direction through the active racks by rotary motions of the plurality of crankshafts.

In addition to the effect of the first embodiment, the second embodiment has the following advantages. Although in the second embodiment only one crankshaft is driven to rotate, a smooth and slow longitudinal motion output can be obtained. Accordingly, there can be provided a rotary motion to longitudinal motion converting mechanism of very small size which does not require an additional mechanism for a power.

The foregoing object is also accomplished in accordance with a third embodiment of the present invention by providing a rotary motion to longitudinal motion converting mechanism comprising a passive rack with a plurality of teeth having wave gear-tooth profile, and a plurality of active racks respectively having a plurality of teeth having the same pitch as that of the teeth of the passive rack and meshing with the passive rack, the tooth of the plurality of active racks being of semicircular arc shape and being constituted by a roller. A plurality of rotatable crankshafts respectively have eccentric circular portions different in phase from one another and respectively have the active racks supported on the eccentric circular portions in such a manner that the passive rack is moved in its longitudinal direction through the active racks by rotary motions of the plurality of rotatable crankshafts.

In addition to the effect of the first embodiment, the third embodiment has its advantages in that the wear on the tooth surface and the sticking of the passive and active racks can be prevented, because the tooth of the active racks is constituted by the roller and is in rolling contact with the tooth of the passive rack.

The foregoing object is accomplished in accordance with a fourth embodiment of the present invention by providing a rotary motion to longitudinal motion converting mechanism comprising a passive rack formed with a plurality of semicircular grooves so that a plurality of teeth having a predetermined pitch are formed therein, a plurality of active racks respectively having a plurality of teeth having the same pitch as that of the teeth of the passive rack and meshing with the passive rack, and a plurality of rotatable crankshafts respectively having eccentric circular portions different in phase from one another and respectively having the active racks supported on the eccentric circular portions in such a manner that the passive rack is moved in its longitudinal direction through the active racks by rotary motions of the plurality of rotatable crankshafts. A roller chain has a plurality of rollers and surrounds the active racks in such a manner that the rollers are held equidistantly in the circumferential direction of the chain and that the active racks engage with the passive rack through the rollers received in the semicircular grooves of the passive rack.

In addition to the effect of the first embodiment, the fourth embodiment has the following advantages. Since the passive rack undergoes the thrust from the active racks through a plurality of the rollers each having a predetermined hardness and a wide area, the surface pressure of the teeth of the passive rack can be reduced, and a desired durability can be obtained without hardening the passive rack by carburizing, induction hardening, etc. Accordingly, working of components can be facilitated. Further, in a case where friction between the roller and the active racks became large, the roller rotates about its axis, so sticking caused by wear can be prevented. Accordingly, the device of the present invention is further enhanced in durability.

BRIEF DESCRIPTION OF THE DRAWINGS

The above and other objects and advantages will become apparent from the following detailed description when read in conjunction with the accompanying drawings wherein:

FIG. 10 is a perspective view of a third embodiment of the rotary motion to longitudinal motion converting mechanism according to the present invention;

FIG. 17 is a perspective view of a fourth embodiment of the rotary motion to longitudinal motion converting mechanism according to the present invention;

DESCRIPTION OF THE PREFERRED EMBODIMENTS

Figure 1:
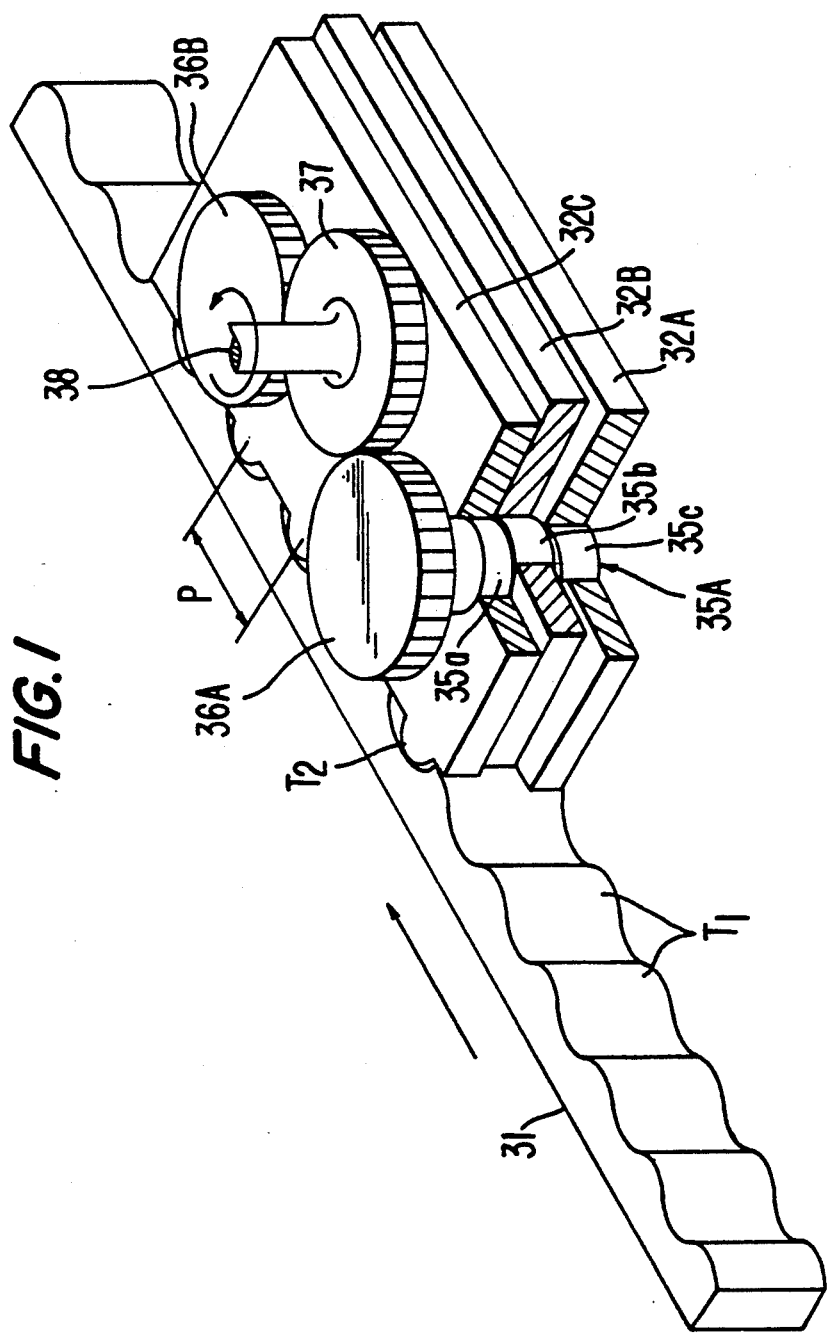
FIG. 1 is a perspective view of one embodiment of a rotary motion to longitudinal motion converting mechanism according to the present invention.
Figure 2:
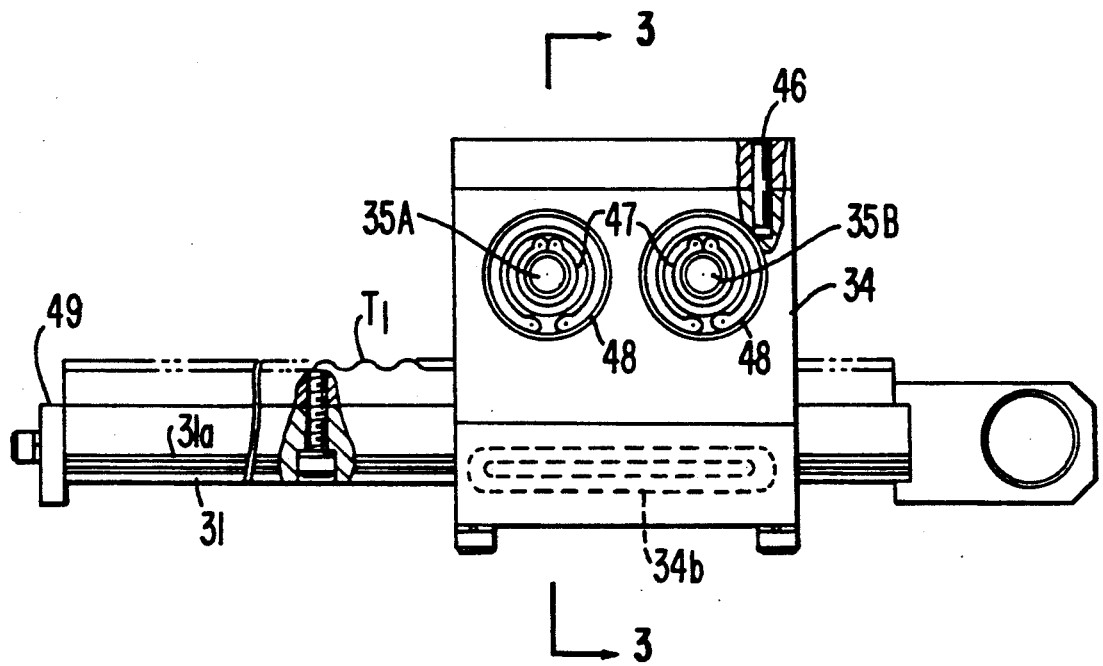
FIG. 2 is a side view illustrating external appearance of the rotary motion to longitudinal motion converting mechanism of FIG. 1.
Figure 3:
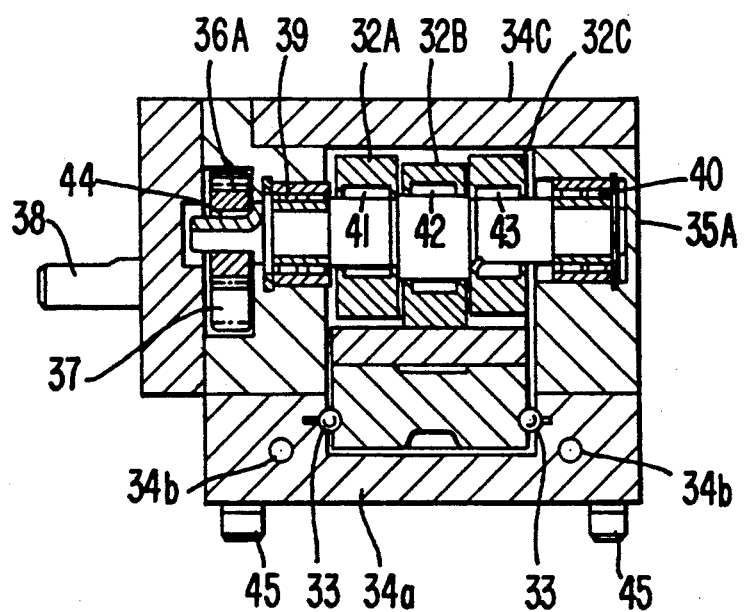
FIG. 3 is a cross sectional view taken substantially along line A—A FIG. 1.
Figure 4:
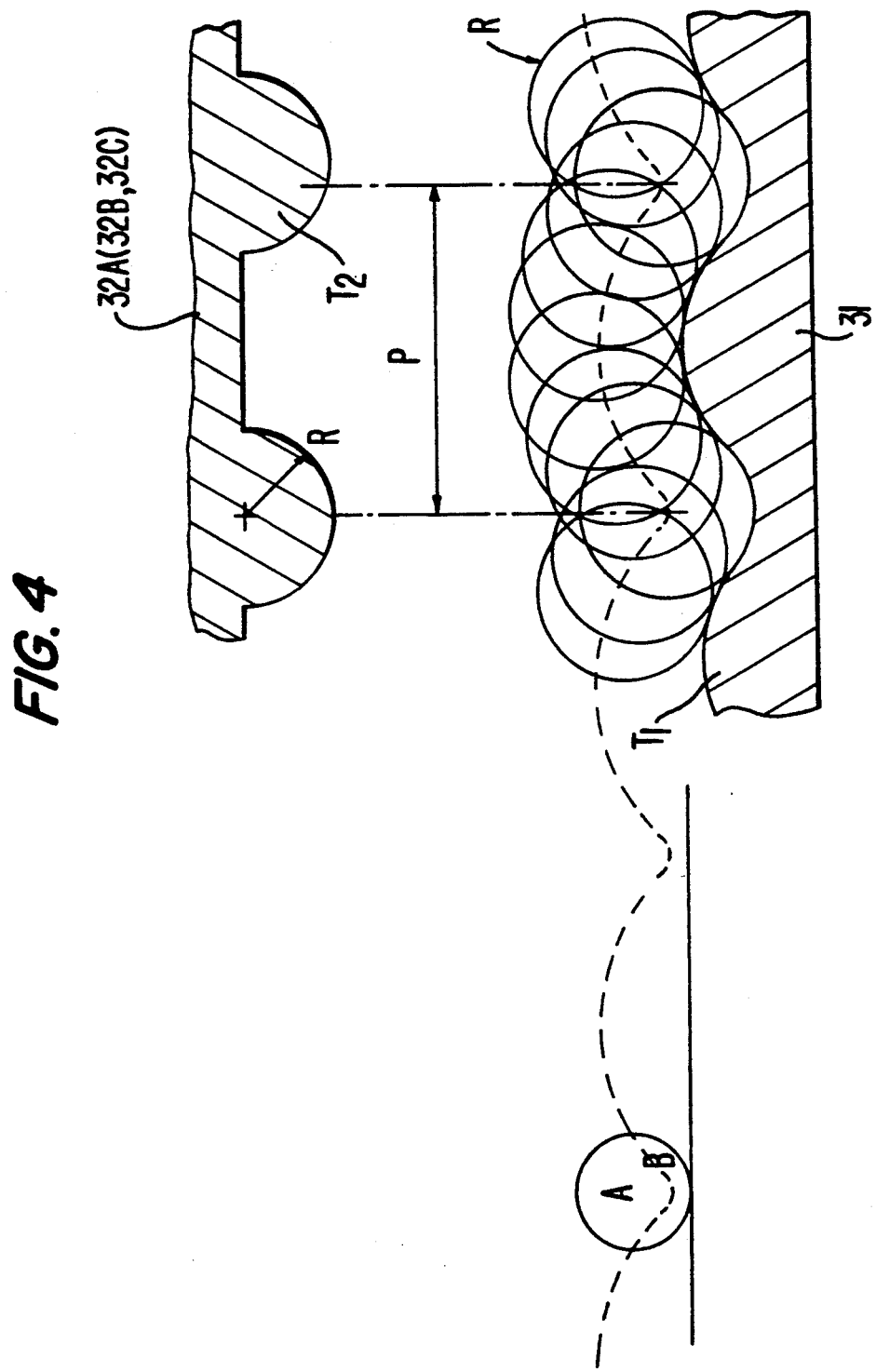
FIG. 4 is an enlarged longitudinal sectional view illustrating the gear-tooth profiles of the passive and active racks of FIG. 1.

Referring now in greater detail to the drawings and initially to FIGS. 1-5, there is shown one embodiment of a rotary motion to longitudinal motion converting mechanism in accordance with the present invention. Reference numeral 31 denotes a passive rack with a plurality of teeth T1, and reference numerals 32A, 32B and 32C denote a plurality of active racks, each of which is formed with a plurality of teeth T2 having the same pitch P as that of the teeth T1 of the passive rack 31. In this embodiment, the active racks comprise three active racks. The teeth T1 of the passive rack 31 are in the form of trochoidal or cycloidal (wave) gear-tooth profile as shown in FIG. 4. The teeth T2 of the active racks 32A, 32B and 32C are in the form of semicircular arc gear-tooth profile having the same radius R as that of a base circle of the gear-tooth profile of the teeth T1. As shown in FIGS. 2 and 3, the passive rack 31 is supported through a plurality of balls 33 of the circulation type to a casing 34 so that it can move in the longitudinal direction thereof. The passive rack 31 is formed at its opposite side portions with longitudinal grooves 31a in which the balls 33 are received, and the bottom portion 34a of the casing 34 is formed with ball circulation passageways 34b and 34b. The active racks 32A, 32B and 32C are supported on the eccentric circular portions 35a, 35b and 35c (FIG. 1) of a pair of crankshafts 35A and 35B in such a manner that the teeth T2 of the racks 32A, 32B and 32C are brought into engagement with the passive rack 31. Each of the crankshafts 35A and 35B is rotatably supported on the casing 34 through a pair of bearings 39 and 40. The eccentric circular portions 35a, 35b and 35c of each crankshaft are formed equiangularly, and the crankshafts 35A and 35B are connected at their one end with gears 36A and 36B, respectively. Therefore, when the gears 36A and 36B rotate, the crankshafts 35A and 35B are rotated, so that the active racks 32A, 32B and 32C are rotated maintaining a predetermined phase difference. The predetermined phase difference is determined by the number of active racks. Therefore, in this embodiment the phase difference is 120 degrees. The rotary motions of the active racks 32A, 32B and 32C different in phase from one another cause the passive rack 31 to move in the longitudinal direction thereof. The crankshaft driving gears 36A and 36B are engaged by an input gear 37, which is mounted on an input shaft 38 rotatably supported on the casing 34 through a bearing (not shown). The input shaft 38 has its one end, which protrudes outwardly from the casing 34 and through which rotary input is inputted.

While it has been described that the teeth T1 of the passive rack 31 are in the form of wave gear-tooth profile and that the teeth T2 of the active racks 32A, 32B and 32C are in the form of semicircular arc gear-tooth profile, it is noted that the teeth T1 may also be in the form of semicircular arc gear-tooth profile and that the teeth T2 may also be in the form of wave gear-tooth profile.

As shown in FIGS. 1-3, needle bearings 41, 42 and 43 are interposed between the active rack 32A and the eccentric circular portion 35a of the crankshaft 35A, between the active rack 32B and the eccentric circular portion 35b of the crankshaft 35A, and between the active rack 32C and the eccentric circular portion 35c of the crankshaft 35A, respectively. Reference numeral 44 is a key by which the gear 36A is fixedly mounted on the crankshaft 35A. Reference numerals 45 and 45 are bolts by which the bottom portion 34a of the casing 34 is fixed. Reference numeral 46 is a pin by which the top portion 34c of the casing 34 is fixed. Reference numerals 47 and 48 are retaining rings for regulating axial movement between the casing 34 and the crankshafts 35A, 35B through bearings 39 and 40. Reference numeral 49 is a stop ring by which the moving end of the passive rack 31 is determined.

The operation of the embodiment of FIGS. 1-5 will hereinafter be described in detail.

Figure 5A:
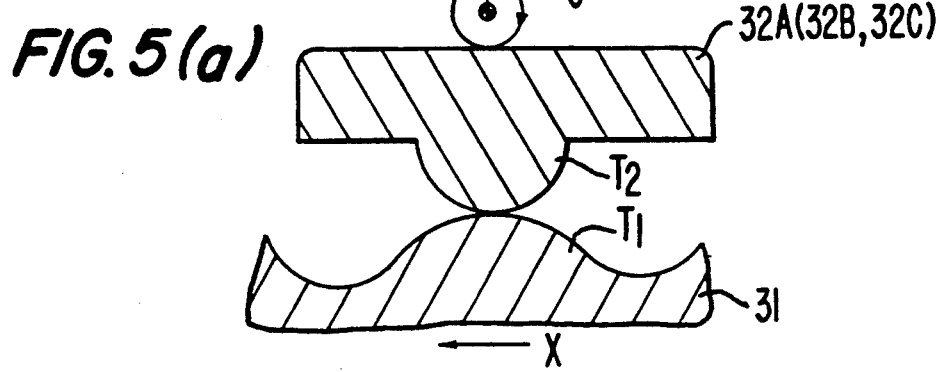
FIGS. 5(a)-5(c) are part-sectional views illustrating how the passive rack is moved in its longitudinal direction by the active racks, respectively.
Figure 5B:
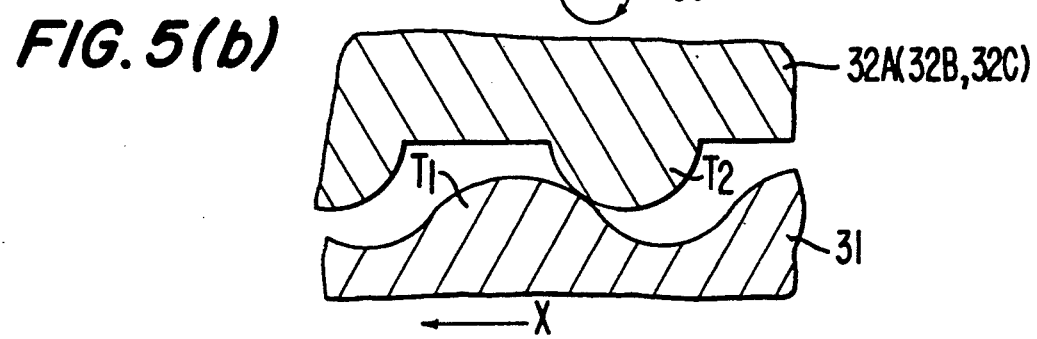
Figure 5C:
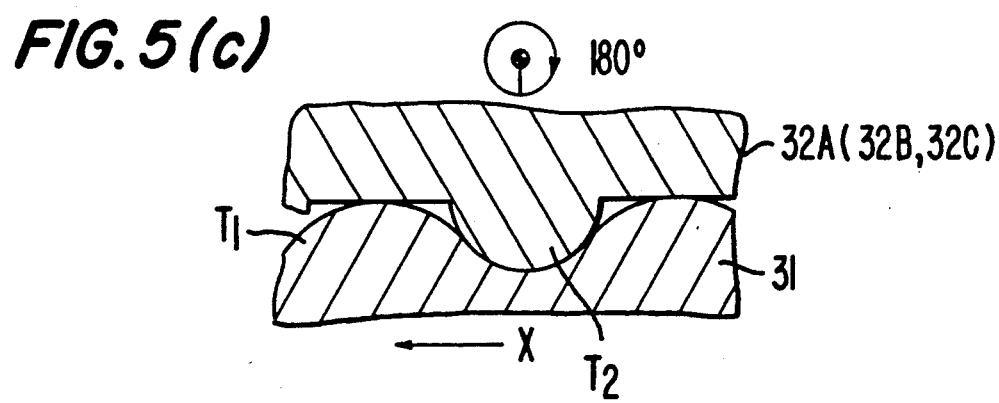

If the input shaft 38 is rotated by external drive means (not shown), the input gear 37 mounted on the input shaft 38 will rotate and cause the gears 36A and 36B meshing with this input gear 37 to rotate in the same direction. The rotations of the gears 36A and 36B then cause the crankshafts 35A and 35B to be driven to rotate. By the rotations of the crankshafts 35A and 35B, the active racks 32A, 32B and 32C are rotated maintaining a predetermined phase difference. As the crankshafts 35A and 35B are rotated, the tooth T2 of the active rack 32A is rotated as shown in FIGS. 5(a)-5(c) and the passive rack 31 in which one side of the tooth T1 thereof is pushed by the tooth T2 is moved in its longitudinal direction X. Since the active racks 32A, 32B and 32C are rotated maintaining a predetermined phase difference determined by the number of the active racks, at least one of the active racks 32A, 32B and 32C is brought into engagement with the passive rack 31 at the above mentioned one side of the tooth T1 during one revolution of each of the crankshafts 35A and 35B. As a result, the passive rack 31 is caused to move in the longitudinal direction X by the rotary motion of the active rack meshing with the passive rack. Therefore, if the crankshafts 35A and 35B make one revolutions, respectively, the passive rack 31 will be moved by one pitch P of the teeth T1 or T2.

If, on the other hand, the rotary input to the input shaft 38 is reversed, the crankshafts 35A and 35B will be rotated in the opposite direction and the passive rack 31 moved in the direction opposite to the direction X. During the longitudinal movement of the passive rack 31 caused by the active racks 32A-32C, a side pressure applied to the individual tooth T2 of the active racks 32A-32C becomes smaller because the passive rack 31 is pushed by a suitable number of teeth T2 disposed along the passive rack 31. Consequently, a rotary motion to longitudinal motion converting mechanism whose thrust is large can be accomplished. In addition, since an output reduced in speed by one pitch of the tooth T1 of the passive rack 31 with respect to one revolution of each of the crankshafts 35A and 35b is obtained by the motions of the active racks 32A-32C, an additional speed reducer is not needed. Thus, since a side pressure of the tooth is small and an additional speed reducer is not need, a rotary motion to longitudinal motion converting mechanism of very small size can be accomplished. Furthermore, since the mechanism according to the present invention comprises a combination of racks, it can be formed into a square shape. Also, since guiding means for guiding the passive rack 31 comprises a plurality of balls 33 and the grooves 31a formed in the passive rack 31, the mechanism of the present invention can be made structurally simpler and enhanced in reliability.

Figure 8:
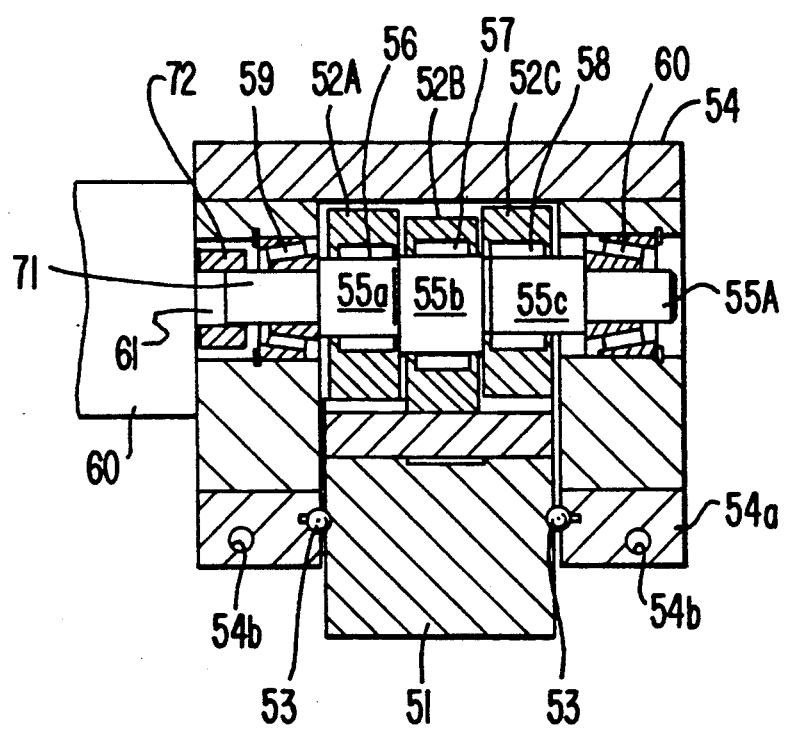
FIG. 8 a cross sectional view taken substantially along line 3—3 of FIG. 7.

FIGS. 6-9 illustrate another embodiment of the rotary motion to longitudinal motion converting mechanism in accordance with the present invention. Reference numeral 51 denotes a passive rack with a plurality of teeth T1, and reference numerals 52A, 52B and 52C denote a plurality of active racks, each of which is formed with a plurality of teeth T2 having the same pitch P as that of the teeth T1 of the passive rack 51. In this embodiment, the active racks comprise three active racks. The teeth T1 of the passive rack 51 are in the form of trochoidal or cycloidal (wave) gear-tooth profile. The teeth T2 of the active racks 52A, 52B and 52C are in the form of semicircular arc gear-tooth profile having the same radius R as that of a base circle of the gear-tooth profile of the teeth T1. As shown in FIG. 8, the passive rack 51 is supported through a plurality of rolling elements, such as balls 53 of the circulation type, to a casing 54 so that it can move in the longitudinal direction thereof. The passive rack 51 is formed at its opposite side portions with longitudinal grooves 51a in which the balls 53 are received, and the bottom portion 54a of the casing 54 is formed with ball circulation passageways 54b and 54b. The active racks 52A, 52B and 52C are supported on the eccentric circular portions 55a, 55b and 55c (FIG. 6) of a pair of crankshafts 55A and 55B in such a manner that the teeth T2 of the racks 52A, 52B and 52C are brought into mesh with the passive rack 51. Each of the crankshafts 55A and 55B is rotatably supported on the casing 54 through a pair of bearings 59 and 60. The eccentric circular portions 55a, 55b and 55c of each crankshaft are formed equiangularly, and in this embodiment the eccentric circular portions are spaced apart 120 degrees. If the crankshaft 55A is rotated by a drive Motor 60 the crankshaft 55B will be rotated, so that the active racks 52A, 52B and 52C are rotated maintaining a predetermined phase difference. The predetermined phase difference is determined by the number of active racks. Therefore, in this embodiment the phase difference is 120 degrees. The rotary motions of the active racks 52A, 52B and 52C different in phase from one another cause the passive rack 51 to move in the longitudinal direction thereof. The drive motor 60 is mounted on the casing 54 and has its output shaft 61 that is connected through a coupling member 72 to an input shaft 72 of the crankshaft 55A. When the crankshaft 55A is rotated by the drive motor 60, the active racks 52A-52C are rotated and also the crankshaft 55B is rotated by the rotation of the crankshaft 55A. Note that the output shaft 61 of the drive motor 60 may also be connected to the crankshaft 55B instead of the crankshaft 55A.

The operation of the second embodiment of FIG. 6 will hereinafter be described in detail.

Figure 9A:
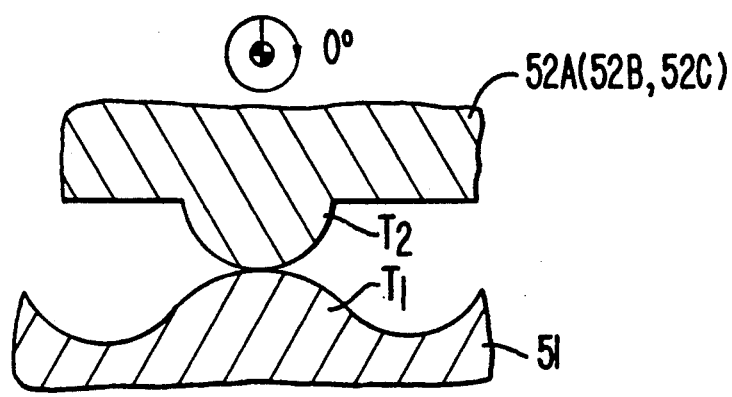
FIGS. 9(a)-9(c) are part-sectional views illustrating how the passive rack is moved in its longitudinal direction by the active racks, respectively.
Figure 9B:
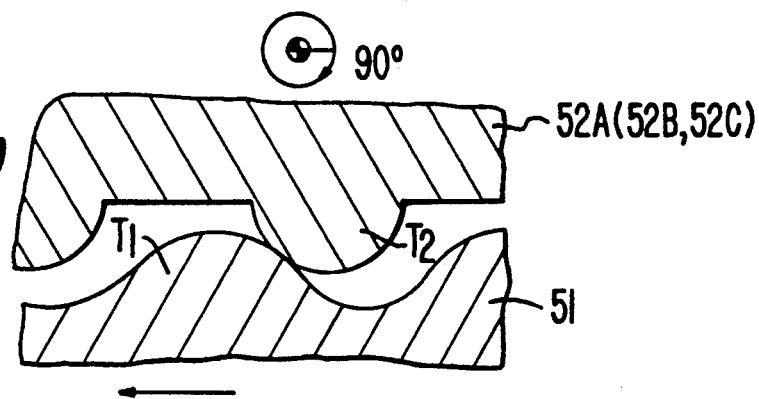
Figure 9C:
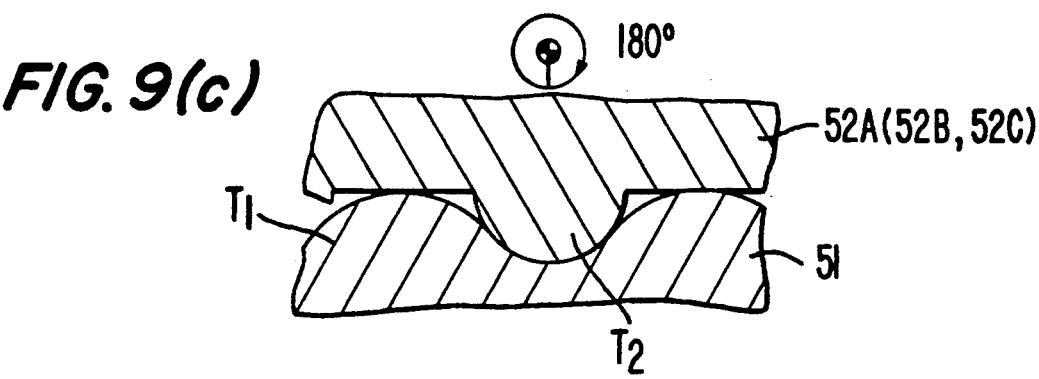

If the crankshaft 55A is rotated by the drive motor 60, the active racks 52A, 52B and 52C will be rotated maintaining a predetermined phase difference. At the same time, the crankshaft 55B is rotated by the rotation of the crankshaft 55B. When this occurs, the tooth T2 of the active rack 52A, 52B and 52C is rotated as shown in FIGS. 9(a)-(c) and the passive rack 51 in which one side of the tooth T1 thereof is pushed by the tooth T2 is moved in its longitudinal direction. Also, since the active racks 52A, 52B and 52 C are rotated maintaining a predetermined phase difference (120 degrees) determined by the number of the active racks, at least one of the active racks 52A, 52B and 52C is brought into engagement with the passive rack 51 at one side of the tooth T1 during one revolution of each of the crankshafts 55A and 55B. As a result, the passive rack 51 is caused to move in the longitudinal direction by the rotary motion of the active rack meshing with the passive rack. Therefore, if the crankshafts 55A and 55B make one revolution, respectively, a decelerated output will be obtained in which the passive rack 51 is moved by one pitch of the teeth T1 or T2. In addition, a side pressure applied to the individual tooth T2 of the active racks 52A-52C becomes smaller because the passive rack 51 is pushed by a suitable number of teeth T2 disposed along the passive rack 51.

Figure 6:
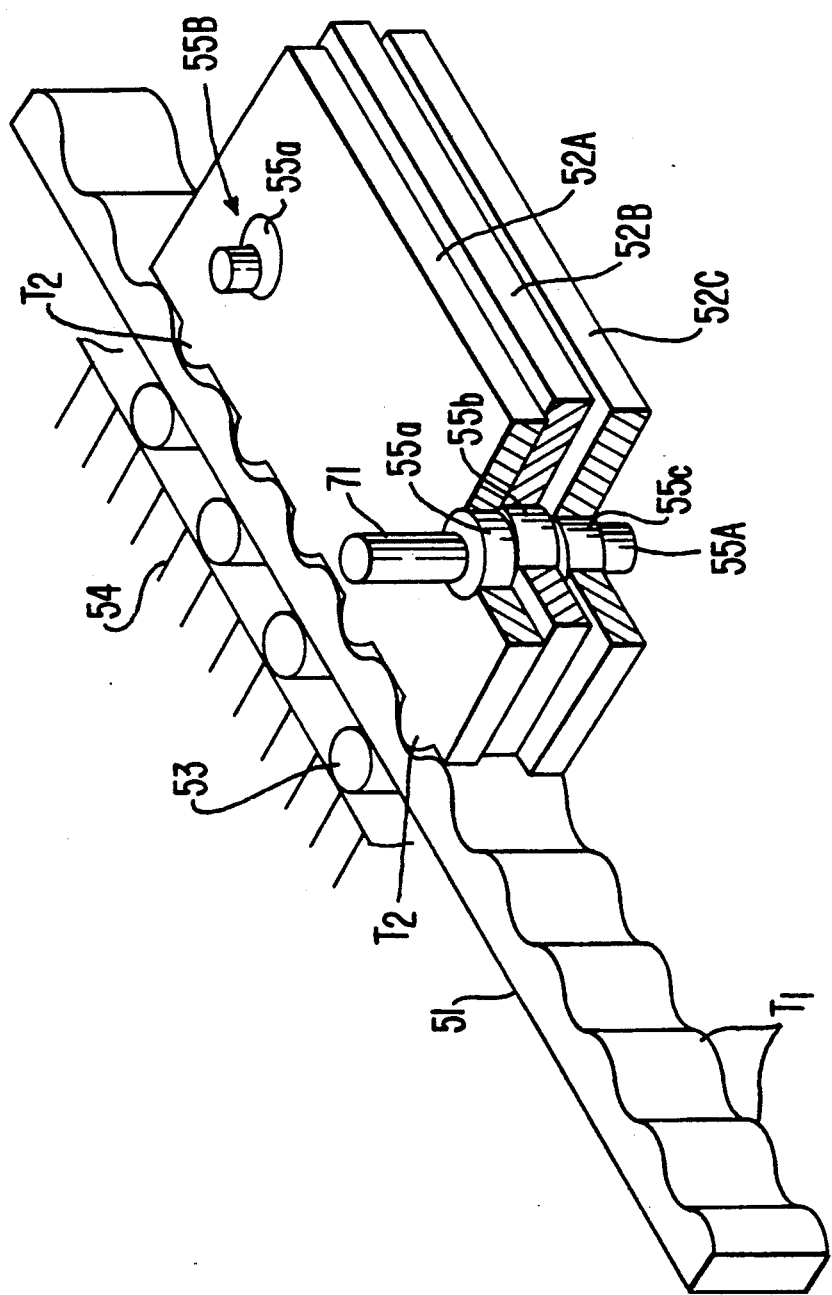
FIG. 6 is a perspective view of another embodiment of the rotary motion to longitudinal motion converting mechanism according to the present invention.
Figure 7:
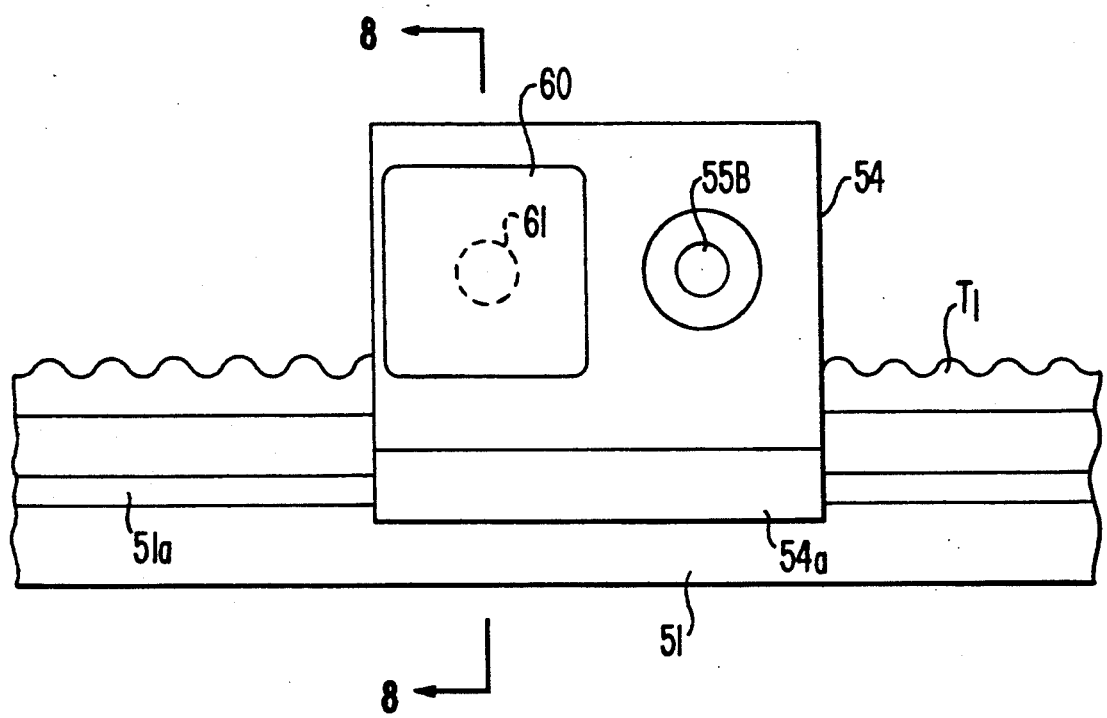
FIG. 7 is a side view illustrating external appearance of the rotary motion to longitudinal motion converting mechanism of FIG. 6.

Accordingly, the second embodiment of FIG. 6 can obtain the same effect as that of the first embodiment of FIG. 1. Further, the inventors have made various investigations and experiments and found the following facts. That is, a smooth and slow longitudinal motion output was obtained although only one crankshaft 55A is driven to rotate. In addition, in a case where teeth of the same gear-tooth profile are formed in the crankshafts 55A and 55B and a driving power is distributed to the crankshafts 55A and 55B by meshing one input gear with the teeth of the crankshafts 55A and 55B, a smooth longitudinal motion was likewise obtained. Accordingly, there can be provided a rotary motion to longitudinal motion converting mechanism of very small size which does not require an additional mechanism for a power distribution such as this. While in the second embodiment of FIG. 6 the crankshaft 55A and the input shaft 71 comprise one piece member, they can be separated from each other as long as the crankshaft 55A rotates together with the input shaft 71. As in the first embodiment of FIG. 1, the teeth T1 may be in the form of semicircular arc gear-tooth profile and the teeth T2 in the form of wave gear-tooth profile. The tooth of semicircular arc gear-tooth profile can be made by mounting a circular pin in a groove of predetermined shape.

Figure 11:
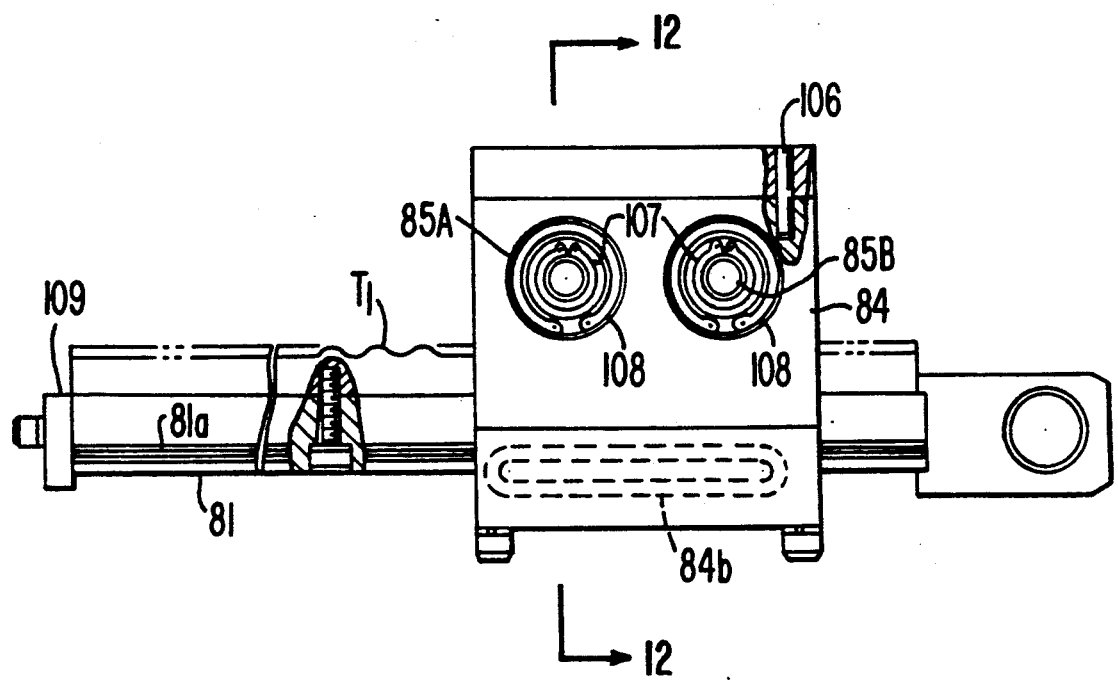
FIG. 11 is a side view illustrating external appearance of the rotary motion to longitudinal motion converting mechanism of FIG. 10.
Figure 12:
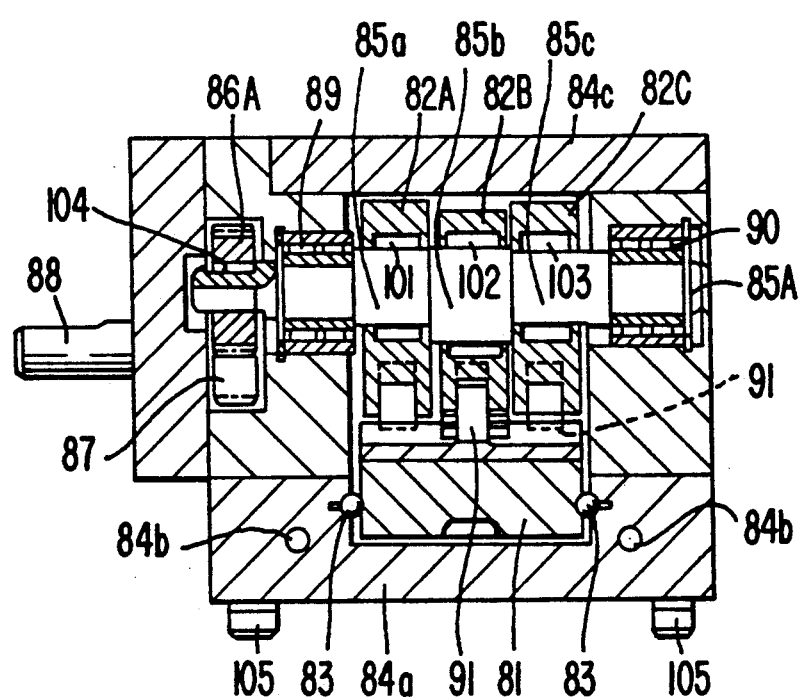
FIG. 12 is a cross sectional view taken substantially along line 12—12 of FIG. 11.
Figure 13:
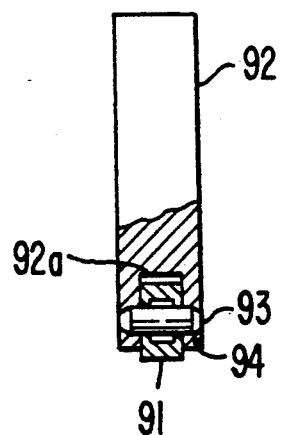
FIG. 13 is an end view, partly in section, showing one of the active racks shown in FIG. 10.
Figure 14:
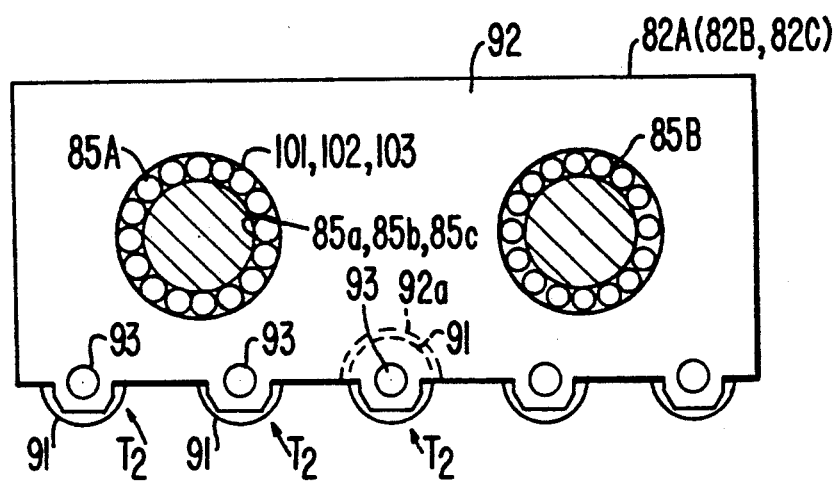
FIG. 14 is a side elevational view of the active racks shown in FIG. 10.
Figure 15:
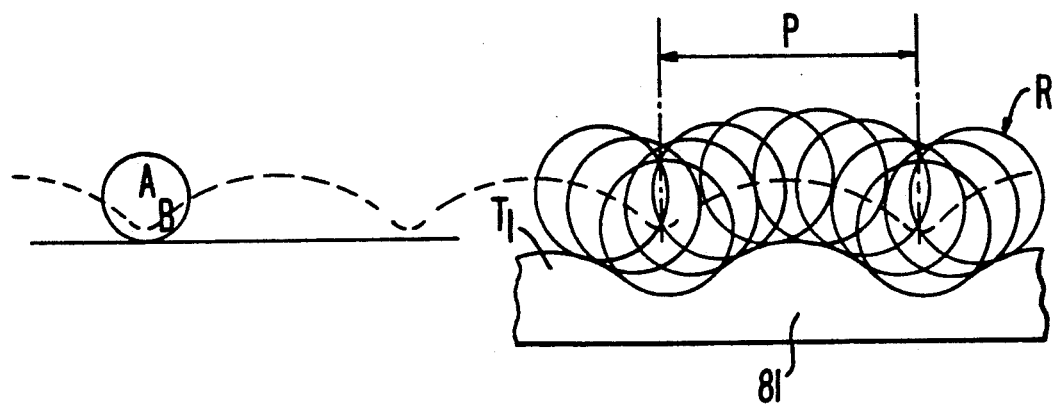
FIG. 15 is a longitudinal sectional view illustrating the gear-tooth profile of the passive rack of FIG. 10.

FIGS. 10-16 illustrate a third embodiment of the rotary motion to longitudinal motion converting mechanism in accordance with the present invention. Reference numeral 81 denotes a passive rack with a plurality of teeth T1, and reference numerals 82A, 82B and 82C denote a plurality of active racks, each of which is formed with a plurality of teeth T2 having the same pitch P as that of the teeth T1 of the passive rack 81. In this embodiment, the active racks comprise three active racks. The teeth T1 of the passive rack 81 are in the form of trochoidal or cycloidal (wave) gear-tooth profile as shown in FIG. 15. The teeth T2 of the active racks 82A, 82B and 82C are in the form of semicircular arc gear-tooth profile having the same radius R as that of a base circle of the gear-tooth profile of the teeth T1. The semicircular arc gear-tooth profile will hereinafter be described in detail. As shown in FIG. 12, the passive rack 81 is supported through a plurality of balls 83 of the circulation type to a casing 84 so that it can move in the longitudinal direction thereof. The passive rack 81 is formed at its opposite side portions with longitudinal grooves 81a in which the balls 83 are received, and the bottom portion 84a of the casing 84 is formed with ball circulation passageways 84b and 84b. The active racks 82A, 82B and 82C are supported on the eccentric circular portions 85a, 85b and 85c (FIG. 10) of a pair of crankshafts 85A and 85B in such a manner that the teeth T2 of the racks 82A, 82B and 82C are brought into engagement with the passive rack 81. Each of the crankshafts 85A and 85B is rotatably supported on the casing 84 through a pair of bearings 89 and 90. The eccentric circular portions 84a, 85b and 85c of each crankshaft are formed equiangularly, and the crankshafts 85A and 85B are connected at their one end with gears 86A and 86B, respectively. Therefore, when the gears 86A and 86B rotate, the crankshafts 85A and 85B are rotated, so that the active racks 82A, 82B and 82C are rotated maintaining a predetermined phase difference. The predetermined phase difference is determined by the number of active racks. Therefore, in this embodiment the phase difference is 120 degrees. The rotary motions of the active racks 82A, 82B and 82C different in phase from one another cause the passive rack 81 to move in the longitudinal direction thereof. The crankshaft driving gears 86A and 86B are engaged by an input gear 87, which is mounted on an input shaft 88 rotatably supported on the casing 84 through a bearing (not shown). The input shaft 88 has its one end, which protrudes outwardly from the casing 84 and through which rotary input is inputted.

As is shown in FIGS. 13 and 14, the individual tooth T2 of the active racks 82A-82C is constituted by a roller 91 having the above mentioned radius R. A plurality of the rollers 91 are inserted into a longitudinal groove 92a of the individual rack in such a manner that they are freely rotatably supported through needle rollers 94 on pins 93 mounted in the active rack, respectively.

In FIGS. 10-12, reference numerals 101, 102 and 103 denote needle bearings interposed between the active rack 82A and the eccentric circular portion 85a of the crankshaft 85A, between the active rack 82B and the eccentric circular portion 85b of the crankshaft 85A, and between the active rack 82C and the eccentric circular portion 85c of the crankshaft 85A, respectively. Reference numeral 104 is a key by which the gear 86A is fixedly mounted on the crankshaft 85A. Reference numerals 105 and 105 are bolts by which the bottom portion 84a of the casing 84 is fixed. Reference numeral 106 is a pin by which the top portion 84c of the casing 84 is fixed. Reference numerals 107 and 108 are retaining rings for regulating axial movement between the casing 84 and the crankshafts 85A, 85B through bearings 89 and 90. Reference numeral 109 is a stop ring by which the moving end of the passive rack 81 is determined.

The operation of the third embodiment of FIG. 10 will hereinafter be described in detail.

Figure 16A:
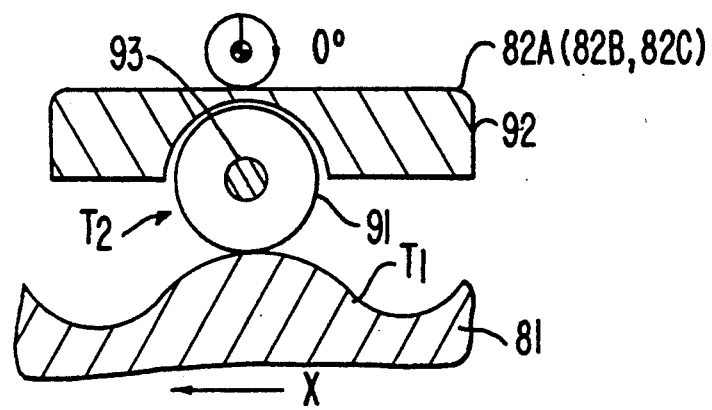
FIGS. 16(a)-16(c) are part-sectional views illustrating how the passive rack is moved in its longitudinal direction by the active racks, respectively.
Figure 16B:
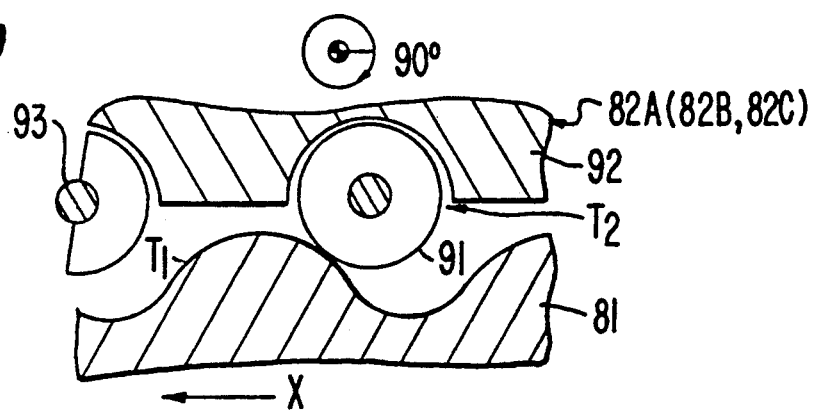
Figure 16C:
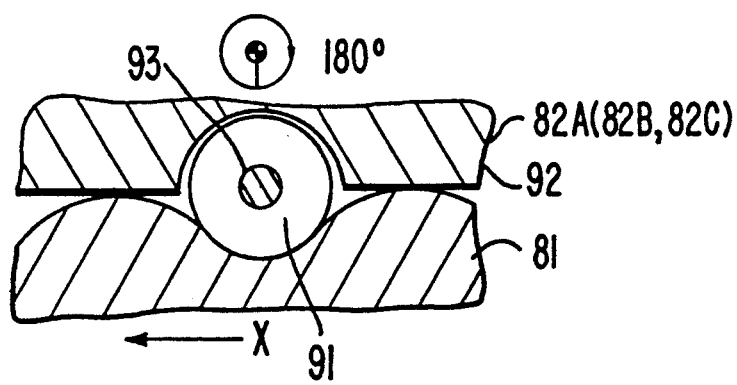

If the input shaft 88 is rotated by external drive means (not shown), the input gear 87 mounted on the input shaft 88 will rotate and cause the gears 86A and 86B meshing with this input gear 87 to rotate in the same direction. The rotations of the gears 86A and 86B then cause the crankshafts 85A and 85B to be driven to rotate. By the rotations of the crankshafts 85A and 85B, the active racks 82A, 82B and 82C are rotated maintaining a predetermined phase difference. As the crankshafts 85A and 85B are rotated, the tooth T2 of the active rack 82A is rotated as shown in FIGS. 16(a)-16(c) and the passive rack 81 in which one side of the tooth T1 thereof is pushed by the tooth T2 is moved in its longitudinal direction X. Since the active racks 82A, 82B and 82C are rotated maintaining a predetermined phase difference determined by the number of the active racks, at least one of the active racks 82A, 82B and 82C is brought into engagement with the passive rack 81 at the above mentioned one side of the tooth T1 during one revolution of each of the crankshafts 85A and 85B. As a result, the passive rack 81 is caused to move in the longitudinal direction X by the rotary motion of the active rack meshing with the passive rack. Therefore, if the crankshafts 85A and 85B make one revolutions, respectively, the passive rack 81 will be moved by one pitch P of the teeth T1 or T2. If, on the other hand, the rotary input to the input shaft 88 is reversed, the crankshafts 85A and 85B will be rotated in the opposite direction and the passive rack 81 moved in the direction opposite to the direction X.

Accordingly, the third embodiment of FIG. 10 can obtain the same effect as that of the first embodiment of FIG. 1. Further, the third embodiment has its advantages in that the wear on the tooth surface and the sticking of the passive and active racks can be prevented, because the tooth T2 of the active racks 82A-82C is constituted by the roller 91 and is in rolling contact with the tooth T1 of the passive rack 81.

Figure 18:
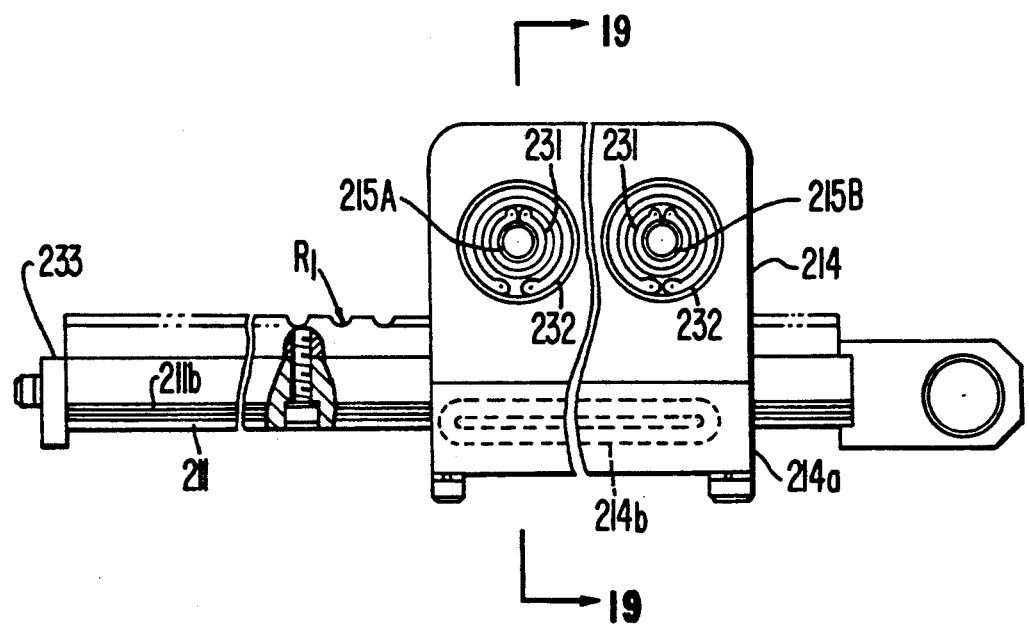
FIG. 18 is a side view illustrating external appearance of the rotary motion to longitudinal motion converting mechanism of FIG. 17.
Figure 19:
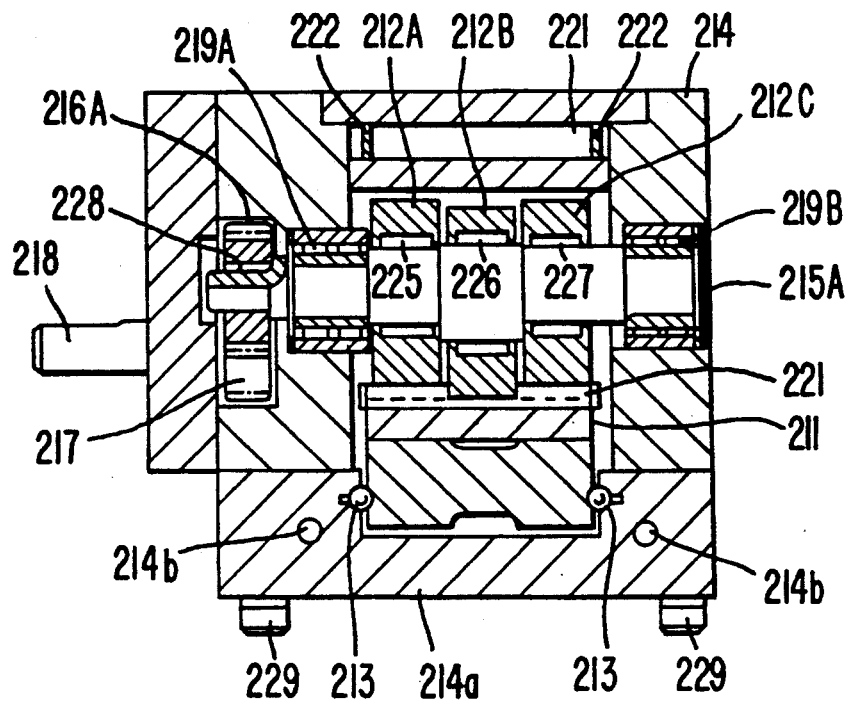
FIG. 19 is a cross sectional view taken substantially along line 19—19 of FIG. 18.
Figure 20:
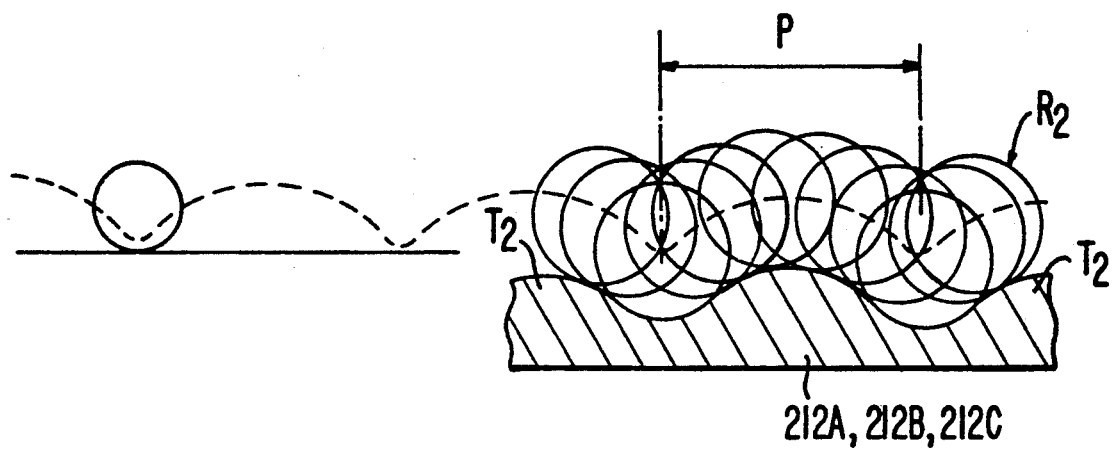
FIG. 20 is a longitudinal sectional view illustrating the gear-tooth profile of the active rack of FIG. 17.

FIGS. 17-21 illustrate a fourth embodiment of the rotary motion to longitudinal motion converting mechanism in accordance with the present invention. Reference numeral 211 denotes a passive rack with a plurality of teeth T1, and reference numerals 212A, 212B and 212C denote a plurality of active racks. In this embodiment, the active racks comprise three active racks. The passive rack 211 is formed with a plurality of semicircular grooves 211a each having a predetermined radius R1 so that the teeth T1 of a predetermined pitch P are formed in the rack 211. The teeth T2 of the active racks 212A-212C have the same pitch P as that of the teeth T1 of the passive rack 211, and are in the form of trochoidal or cycloidal (wave) gear-tooth profile as shown in FIG. 20. As shown in FIG. 19, the passive rack 211 is supported through a plurality of balls 213 of the circulation type to a casing 214 so that it can move in the longitudinal direction thereof. As shown in FIG. 17, the passive rack 211 is formed at its opposite side portions with longitudinal grooves 211a in which the balls 213 are received. It is noted that a plurality of rollers 213 instead of or in addition to the balls 213 may be provided between the casing 214 and the passive rack 211. The active racks 212A, 212B and 212C are supported on the eccentric circular portions 215a, 215b and 215c (FIG. 17) of a pair of crankshafts 215A and 215B in such a manner that the teeth T2 of the racks 212A, 212B and 212C are brought into mesh with the teeth T1 of the passive rack 211 through a plurality of rollers 221. Each of the crankshafts 215A and 215B is rotatably supported on the casing 214 through a pair of bearings 219 and 220. The eccentric circular portions 215a, 215b and 215c of each crankshaft are formed equiangularly, and the crankshafts 215A and 215B are connected at their one end with gears 216A and 216B, respectively. Therefore, when the gears 216A and 216B rotate, the crankshafts 215A and 215B are rotated, so that the active racks 212A, 212B and 212C are rotated maintaining a predetermined phase difference. The predetermined phase difference is determined by the number of active racks. Therefore, in this embodiment the phase difference is 120 degrees. The rotary motions of the active racks 212A, 212B and 212C different in phase from one another cause the passive rack 211 to move in the longitudinal direction thereof. The crankshaft driving gears 216A and 216B are engaged by an input gear 217, which is mounted on an input shaft 218 rotatably supported on the casing 214 through a bearing (not shown). The input shaft 218 has its one end, which protrudes outwardly from the casing 214 and through which rotary input is inputted.

A plurality of the rollers 221 interposed between the passive rack 211 and the active racks 212A-212C have a radius R2 substantially equal to or slightly smaller than the radius R1 of the semicircular groove 211a, and are constructed such that the individual roller 221 can be rotated about its own axis with the roller 221 engaged by the teeth T1 and T2 (FIG. 21). The rollers 221 are freely rotatably supported on pins 223, respectively, which constitute an endless roller chain 220, together with link plates 222 connected together by the pins 223. As shown in FIGS. 17 and 21, the roller chain 220 surrounds the active racks 212A-212C in such a manner that the rollers 221 are held equidistantly in the circumferential direction of the chain 220 and that the active racks 212A-212C engage with the passive rack 211 through the rollers 221. In FIGS. 17-19, reference numerals 225, 226 and 227 denote needle bearings interposed between the active rack 212A and the eccentric circular portion 215a of the crankshaft 215A, between the active rack 212B and the eccentric circular portion 215b of the crankshaft 215A, and between the active rack 212C and the eccentric circular portion 215c of the crankshaft 215A, respectively. Reference numeral 228 is a key by which the gear 216A is fixedly mounted on the crankshaft 215A. Reference numerals 229 and 229 are bolts by which the bottom portion 214a of the casing 214 is fixed. Reference numerals 231 and 232 are retaining rings for regulating axial movement between the casing 214 and the crankshafts 215A, 215B through bearings 219A and 219B. Reference numeral 233 is a stop ring by which the moving end of the passive rack 211 is determined.

The operation of the fourth embodiment of FIG. 17 will hereinafter be described in detail.

Figure 21A:
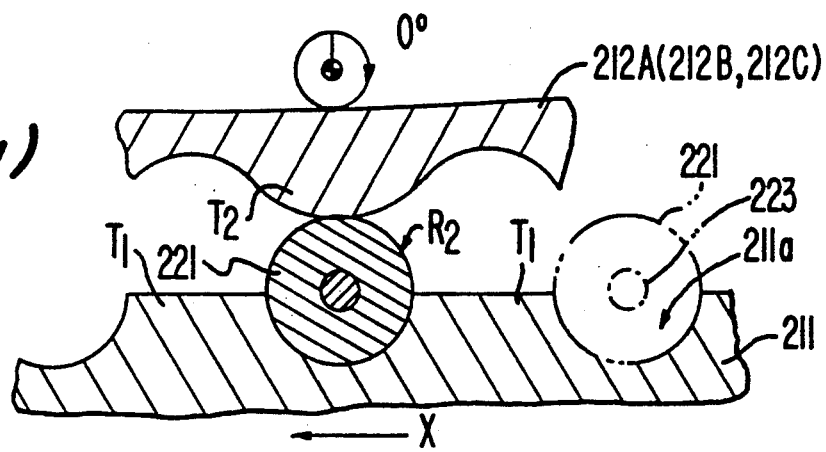
FIGS. 21(a)-21(c) are part-sectional views illustrating how the passive rack is moved in its longitudinal direction by the active racks, respectively.
Figure 21B:
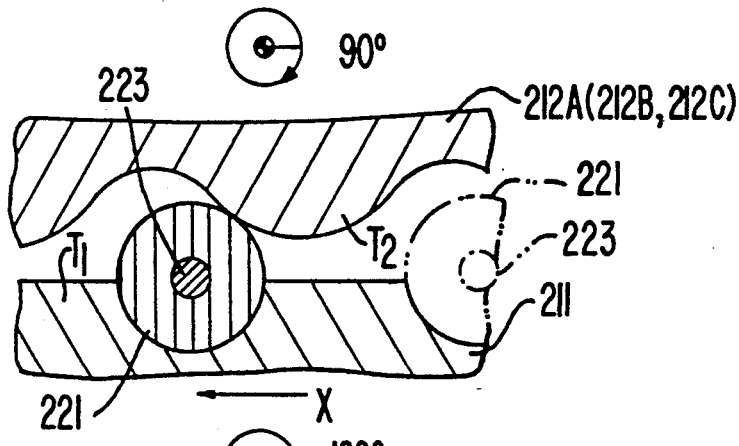
Figure 21C:
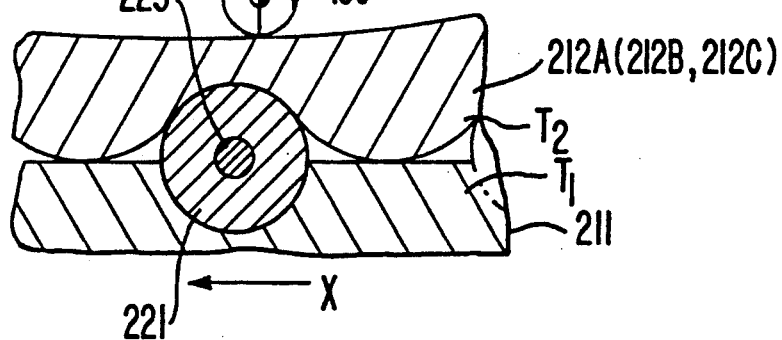
Figure 22:
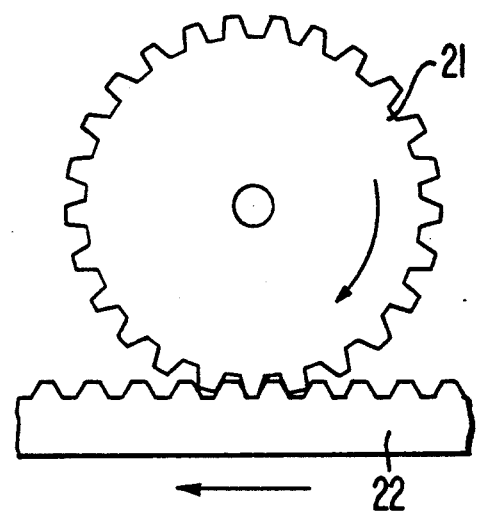
FIG. 22 is a side view of a conventional rotary motion to longitudinal motion converting mechanism (rack-and-pinion gearing)
Figure 23:
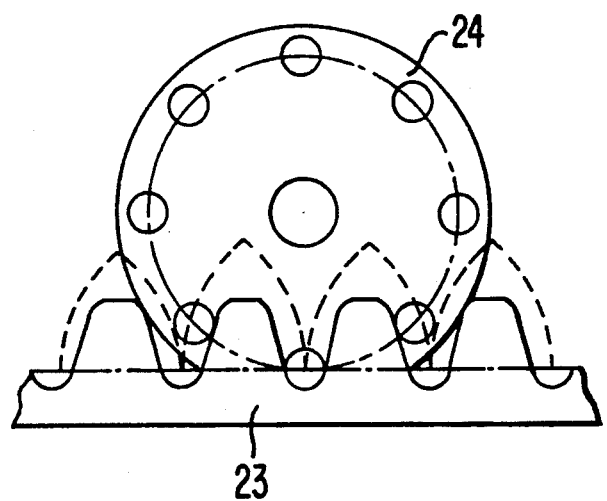
FIG. 23 is a view similar to FIG. 22 showing another conventional rotary motion to longitudinal motion converting mechanism.

If the input shaft 218 is rotated by external drive means (not shown), the input gear 217 mounted on the input shaft 218 will rotate and cause the gears 216A and 216B meshing with this input gear 217 to rotate in the same direction. The rotations of the gears 216A and 216B then cause the crankshafts 215A and 215B to be driven to rotate. By the rotations of the crankshafts 215A and 215B, the active racks 212A, 212B and 212C are rotated maintaining a predetermined phase difference. As the crankshafts 215A and 215B are rotated, the tooth T2 of the active rack 212A is rotated as shown in FIGS. 21(a)-21(c) and the passive rack 211, in which one side of the tooth T1 thereof is pushed by the tooth T2 through the roller 221, is moved in its longitudinal direction X. Since the active racks 212A, 212B and 212C are rotated maintaining a predetermined phase difference determined by the number of the active racks, at least one of the active racks 212A, 212B and 212C is brought into engagement with the passive rack 211 through the rollers 221 during one revolution of each of the crankshafts 215A and 215B. As a result, the passive rack 211 is caused to move in the longitudinal direction X by the rotary motion of the active rack meshing with the passive rack. Therefore, if the crankshafts 215A and 215B make one revolutions, respectively, the passive rack 211 will be moved by one pitch P of the teeth T1 or T2. The longitudinal movement of the passive rack 211 causes the roller chain 220 to rotate along the active racks 212A-212C. If, on the other hand, the rotary input to the input shaft 218 is reversed, the crankshafts 215A and 215B will be rotated in the opposite direction and the passive rack 211 moved in the direction opposite to the direction X.

Accordingly, in addition to the advantages of the first embodiment of FIG. 1 over the prior art, the fourth embodiment of FIG. 17 has the following advantages. Since the passive rack 211 undergoes the thrust from the active racks 212A-212C through a plurality of the rollers 221 each having a predetermined hardness and a wide area, the surface pressure of the teeth of the passive rack 211 can be reduced, and a desired durability can be obtained without hardening, the passive rack 211 by carburizing, induction hardening, etc. Accordingly, working of components can be facilitated. Further, in a case where friction between the roller 221 and the active racks 212A-212C became large, the roller 221 rotates about its axis, so sticking caused by wear can be prevented. Accordingly, the device of the present invention is further enhanced in durability.

Although in the above mentioned embodiments it is has been described that the passive rack is moved in its longitudinal direction, it is noted that the casing itself (34, 54, 84 and 214) can also be moved on and along the passive rack when the passive rack is fixed.

While the subjection invention has been described with relation to the preferred embodiments, various modifications and adaptations thereof will now be apparent to those skilled in the art. All such modifications and adaptations as fall within the scope of the appended claims are intended to be covered thereby.

What we claim is:

1. A rotary motion to longitudinal motion converting mechanism comprising:
   a passive rack with a plurality of teeth having a predetermined pitch;
   a plurality of active racks respectively having a plurality of teeth having said predetermined pitch and meshing with said passive rack; and
   a plurality of rotatable crankshafts respectively having eccentric circular portions different in phase from one another and respectively having said active racks supported on said eccentric circular portions in such a manner that said passive rack is moved in its longitudinal direction through said active racks by rotary motions of said plurality of rotatable crankshafts.

2. A rotary motion to longitudinal motion converting mechanism as set forth in claim 1, wherein the teeth of one of said passive rack and said active racks are in the form of wave gear-tooth profile and the teeth of the other are in the form of semicircular arc gear-tooth profile.

3. A rotary motion to longitudinal motion converting mechanism as set forth in claim 1, which further comprises passive-rack guiding means comprising longitudinal grooves formed in opposite side portions of said passive rack and a plurality of balls rotatably received in said longitudinal grooves.

4. A rotary motion to longitudinal motion converting mechanism as set forth in claim 1, wherein said plurality of active racks comprise three active racks.

5. A rotary motion to longitudinal motion converting mechanism comprising:
   a passive rack with a plurality of teeth having a predetermined pitch;
   a plurality of active racks respectively having a plurality of teeth having said predetermined pitch and meshing with said passive rack;
   a casing having a plurality of crankshafts freely rotatably supported thereon; and
   drive means mounted on said casing and connected to one of said plurality of crankshafts for driving said one of said plurality of crankshafts;
   when said one of said plurality of crankshafts is rotated by said drive means, the remaining crankshafts being rotated together with said one of said plurality of crankshafts through said plurality of active racks; and
   said plurality of crankshafts respectively having eccentric circular portions different in phase from one another and respectively having said active racks supported on said eccentric circular portions in such a manner that said passive rack is moved in its longitudinal direction through said active racks by rotary motions of said plurality of crankshafts.

6. A rotary motion to longitudinal motion converting mechanism comprising:
   a passive rack with a plurality of teeth having wave gear-tooth profile and a predetermined pitch;
   a plurality of active racks respectively having a plurality of teeth having said predetermined pitch and meshing with said passive rack, the teeth of said plurality of active racks each comprising a roller; and
   a plurality of rotatable crankshafts respectively having eccentric circular portions different in phase from one another and respectively having said active racks supported on said eccentric circular portions in such a manner that said passive rack is moved in its longitudinal direction through said active racks by rotary motions of said plurality of rotatable crankshafts.

7. A rotary motion to longitudinal motion converting mechanism comprising:
- a passive rack formed with a plurality of semicircular grooves so that a plurality of teeth having a predetermined pitch are formed therein;
- a plurality of active racks respectively having a plurality of teeth having said predetermined and pitch and meshing with said passive rack;
- a plurality of rotatable crankshafts respectively having eccentric circular portions different in phase from one another and respectively having said active racks supported on said eccentric circular portions in such a manner that said passive rack is moved in its longitudinal direction through said active racks by rotary motions of said plurality of rotatable crankshafts; and
- a roller chain having a plurality of rollers and surrounding said active racks in such a manner that said rollers are held equidistantly in the circumferential direction of said chain and that said active racks engage with said passive rack through said rollers received in said semicircular grooves of said passive rack.

* * * * *